US010671685B1

(12) United States Patent
Tomkins et al.

(10) Patent No.: US 10,671,685 B1
(45) Date of Patent: *Jun. 2, 2020

(54) SUGGESTION REFINEMENT

(71) Applicant: Google Inc., Mountain View, CA (US)

(72) Inventors: Andrew Tomkins, Menlo Park, CA (US); Shanmugasundaram Ravikumar, Berkeley, CA (US)

(73) Assignee: Google LLC, Mountain View, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 15/424,108

(22) Filed: Feb. 3, 2017

Related U.S. Application Data

(63) Continuation of application No. 13/927,504, filed on Jun. 26, 2013, now Pat. No. 9,563,641.

(51) Int. Cl.
*G06F 7/00* (2006.01)
*G06F 17/30* (2006.01)
*G06F 16/9537* (2019.01)
*G06F 16/248* (2019.01)
*G06F 16/2457* (2019.01)

(52) U.S. Cl.
CPC ........ *G06F 16/9537* (2019.01); *G06F 16/248* (2019.01); *G06F 16/24578* (2019.01)

(58) Field of Classification Search
CPC ........... G06F 16/9537; G06F 16/24578; G06F 16/248
USPC ......................................................... 707/724
See application file for complete search history.

(56) References Cited

U.S. PATENT DOCUMENTS

| 7,743,048 | B2 * | 6/2010 | Baldwin | G06F 16/9537 |
| | | | | 707/713 |
| 8,073,460 | B1 * | 12/2011 | Scofield | H04W 4/21 |
| | | | | 455/456.1 |
| 2002/0102993 | A1 * | 8/2002 | Hendrey | G06Q 10/00 |
| | | | | 455/456.3 |
| 2010/0125630 | A1 * | 5/2010 | Krishnamurthy | G06Q 10/10 |
| | | | | 709/204 |
| 2011/0218992 | A1 * | 9/2011 | Waldman | G01C 21/3617 |
| | | | | 707/724 |
| 2011/0302117 | A1 * | 12/2011 | Pinckney | G06Q 30/02 |
| | | | | 706/12 |
| 2011/0307478 | A1 * | 12/2011 | Pinckney | G06Q 30/02 |
| | | | | 707/724 |
| 2012/0016678 | A1 * | 1/2012 | Gruber | G10L 13/02 |
| | | | | 704/275 |
| 2012/0131209 | A1 * | 5/2012 | Chatterjee | G06Q 30/0201 |
| | | | | 709/228 |

(Continued)

*Primary Examiner* — Binh V Ho
(74) *Attorney, Agent, or Firm* — Lerner, David, Littenberg, Krumholz & Mentlik, LLP

(57) ABSTRACT

Methods and apparatus related to adjusting the ranking of a suggestion for a geographic location based on determining how many of one or more users visited the geographic location after receiving the suggestion. In some implementations the one or more users may belong to first grouping of users and the ranking may be adjusted only for suggestions to the first grouping of users. In some implementations it may be determined if a second grouping of users visited the geographic location after receiving the suggestion. In some implementations a property of the given geographic location may be determined based on a comparison of how many of the second grouping of users visited the given geographic location after receiving the suggestion and how many of the one or more users visited the given geographic location after receiving the suggestion.

20 Claims, 3 Drawing Sheets

Provide a suggestion to one or more users — 300

Identify locational data for the one or more users — 305

Determine how many of the one or more users visited the given geographic location after receiving the suggestion — 310

Adjust a ranking of the suggestion based on a determination of how many of the one or more users visited the geographic location after receiving the suggestion — 315

(56) References Cited

U.S. PATENT DOCUMENTS

| | | | | |
|---|---|---|---|---|
| 2012/0272172 | A1* | 10/2012 | Nicks | G06Q 10/00 715/771 |
| 2012/0290434 | A1* | 11/2012 | Moritz | G06Q 30/0261 705/26.7 |
| 2012/0303446 | A1* | 11/2012 | Busch | H04W 4/023 705/14.45 |
| 2012/0303626 | A1* | 11/2012 | Friedmann | G06Q 30/02 707/740 |
| 2012/0310784 | A1* | 12/2012 | Bartley | H04L 65/4084 705/27.1 |
| 2013/0097246 | A1* | 4/2013 | Zifroni | G06Q 50/01 709/204 |
| 2013/0124449 | A1* | 5/2013 | Pinckney | G06N 5/048 706/52 |
| 2013/0237254 | A1* | 9/2013 | Papakipos | G06Q 10/10 455/456.3 |
| 2013/0325839 | A1* | 12/2013 | Goddard | G06F 16/9537 707/708 |
| 2013/0332208 | A1* | 12/2013 | Mehta | G06Q 10/02 705/5 |
| 2014/0075336 | A1* | 3/2014 | Curtis | G06F 3/0481 715/753 |
| 2014/0298169 | A1* | 10/2014 | Williams | H04N 21/25841 715/716 |
| 2014/0365944 | A1* | 12/2014 | Moore | G01C 21/00 715/772 |
| 2015/0100240 | A1* | 4/2015 | Toopran | G01C 21/3608 701/539 |
| 2015/0248411 | A1* | 9/2015 | Krinker | G06F 16/24578 707/748 |

* cited by examiner

SUGGESTION REFINEMENT

CROSS-REFERENCE TO RELATED APPLICATIONS

The present application is a continuation of U.S. patent application Ser. No. 13/927,504, filed on Jun. 26, 2013, the disclosure of which is incorporated herein by reference.

BACKGROUND

This specification is directed generally to determining whether a suggestion for a geographic location is a useful suggestion, and more particularly, to refining one or more aspects of a suggestion for a geographic location based on determining how many of one or more users visited the geographic location after receiving the suggestion.

Suggestions to visit locations are often provided based on a ranking of the locations and/or geographic location of the locations. For example, a particular restaurant that is geographically close to a user may be recommended to a user as a potential restaurant the user may enjoy.

BRIEF SUMMARY

The present disclosure is directed to methods and apparatus for adjusting the ranking of a suggestion for a geographic location based on determining how many of one or more users visited the geographic location after receiving the suggestion. Locational data may be used to determine how many of the one or more users visited the geographic location after receiving the suggestion. In some implementations the one or more users may belong to a first grouping of users and the ranking may be adjusted only for suggestions to users from the first grouping of users. In some implementations it may be determined if one or more users from a second grouping of users visited the geographic location after receiving the suggestion. In some implementations a property of the geographic location may be determined based on a comparison of how many of the one or more users from the first grouping of users visited the geographic location after receiving the suggestion and how many of the one or more users from the second grouping of users visited the geographic location after receiving the suggestion.

In some implementations a computer implemented method may be provided that includes the steps of: providing a suggestion to one or more users, where the suggestion may be indicative of a potential user activity at a given geographic location; determining locational data for the one or more users; determining, based on the locational data, how many of the one or more users visited the given geographic location after receiving the suggestion; and adjusting a ranking of the suggestion based on a determination of how many of the one or more users visited the geographic location after receiving the suggestion.

This method and other implementations of technology disclosed herein may each optionally include one or more of the following features.

In some implementations the step of providing the suggestion to one or more users may include providing the suggestion based on the physical location of the user.

In some implementations the locational data may include data indicative of locational queries of users to the given geographic location and the step of determining, based on the locational data, how many of the one or more users visited the given geographic location after receiving the suggestion may include identifying the data indicative of locational queries of users to the given geographic location.

In some implementations the locational data may include data indicative of check-ins to the geographic location and the step of determining, based on the locational data, how many of the one or more users visited the given geographic location after receiving the suggestion may include identifying the data indicative of check-ins to the given geographic location.

In some implementations the locational data may include data based on at least one of cellular tower signals and Wi-Fi signals.

The method may further include determining, based on the locational data, that a threshold number of the one or more users may have failed to visit the given geographic location after receiving the suggestion; and demoting the ranking of the suggestion based on the determination that the threshold number of the one or more users may have failed to visit the given geographic location after receiving the suggestion. In some implementations the users may be a grouping of users and the ranking of the suggestion may be adjusted only for the grouping of users.

The method may further comprise determining a visit duration time of one or more users at the given geographic location, where the ranking of the suggestion may be further based on the visit duration time.

In some implementations the users may be a first grouping of users. The method may further comprise providing the suggestion to one or more users in a second grouping of users; identifying locational data for the one or more users in the second grouping of users; determining, based on the locational data, how many of the one or more users in the second grouping of users may have visited the given geographic location after receiving the suggestion; and determining a property of the given geographic location based on a comparison of how many of the first grouping of users may have visited the given geographic location after receiving the suggestion and how many of the second grouping of users may have visited the given geographic location after receiving the suggestion. In some implementations the first grouping of users and the second grouping of users may include one or more overlapping users.

The method may further comprise determining, based on the locational data, that a threshold number of the one or more users may have failed to visit the given geographic location within a time period after receiving the suggestion; and adjusting the ranking of the suggestion based on the determination that the threshold number of the one or more users may have failed to visit the geographic location within the time period after receiving the suggestion. In some implementations the users may be a grouping of users and the ranking of the suggestion may be adjusted only for the grouping of users.

In some implementations the suggestion may include a group of suggestions sharing one or more characteristics.

The method may further comprise providing a second suggestion for the given geographical location to one or more users in a second grouping of users, the second suggestion being unique from the suggestion; identifying locational data for the one or more users in the second grouping of users; determining, based on the locational data, how many of the one or more users in the second grouping of users may have visited the given geographic location after receiving the second suggestion; and adjusting a ranking of the second suggestion based on a determination of how many of the one or more users in the second grouping of users may have visited the geographic location after receiving the second suggestion; where the determined ranking of the suggestion and the determined ranking of the second suggestion may be unique. In some implementations the second suggestion may be associated with at least one of a unique time of delivery property, a unique location of delivery property, and unique visible content property relative to the suggestion.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify locational data associated with one or more users to adjust the ranking of a suggestion associated with a geographic location based on determining how many of one or more users visited the geographic location after receiving the suggestion. Particular implementations of the subject matter described herein may determine a property of a geographic location based on a comparison of how many of a first grouping of users visited the geographic location after receiving the suggestion and how many of a second grouping of users visited the geographic location after receiving the suggestion.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Technology described herein determines and/or provides a refined suggestion for a geographic location. The suggestion may be refined based on determining how many of one or more users visited the geographic location after receiving a suggestion for that geographic location. A property of a geographic location may optionally be determined based on how many of a first grouping of users visited the geographic location after receiving a suggestion for that geographic location, and how many of a second grouping of users visited the geographic location after receiving a suggestion for that geographic location. In some implementations the suggestion for a geographic location is refined because a rank associated with the suggestion is adjusted. The rank may be adjusted based on indicated activity associated with the geographic location by one or more users after the users receive the suggestion for that geographic location. The ranking of a suggestion may be indicative of the usefulness of the suggestion to one or more users.

Figure 1:
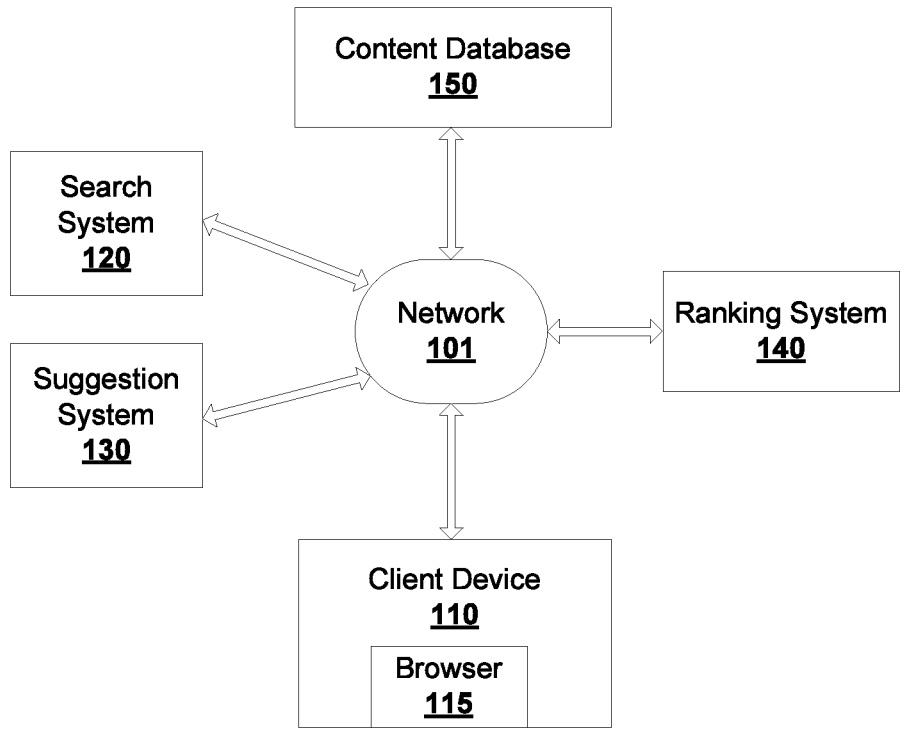
FIG. 1 is a block diagram of an example environment in which the ranking of a suggestion for a geographic location may be adjusted based on determining how many of one or more users visited the geographic location after receiving the suggestion.

FIG. 1 illustrates a block diagram of an example environment 100 in which the ranking of a suggestion for a geographic location may be adjusted based on determining how many of one or more users visited the geographic location after receiving the suggestion. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a search system 120, a suggestion system 130, a ranking system 140, and a content database 150. The client device 110 may execute one or more applications, such as a web browser 115. The client device 110 may be, for example, a desktop computer, a laptop, a tablet computer, a mobile phone, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided. In some implementations each computing device may optionally be associated with a unique identifier such as a unique IP address, a unique MAC address, etc. In some implementations one or more computing devices may have one or more identifier in common.

The suggestion system 130 may provide suggestions for a given geographic location to one or more users. The suggestions may be indicative of a potential user activity at the given geographic location. For example, the suggestion may be for a fine dining establishment in downtown, for watching a sporting event at a sporting bar and grille, for a menu item at the sporting bar and grille, for a book reading and/or signing by a best-selling author at a bookstore, for a book sale at the bookstore, for an opera, for a musical performance, for an art exhibit, for a nearby park, for purchase of merchandise, for travel-related promotions, and so forth. In some implementations one or more of the suggestions may be provided at least in part based on rankings that are associated with the suggestions. The ranking of one or more of the suggestions may be determined by the ranking system 140. In some implementations the ranking system 140 may adjust an existing ranking associated with a suggestion. In some implementations the ranking system 140 may initially determine a ranking for a suggestion.

For a suggestion to a given geographic location that was provided to one or more users, locational data may be identified for the one or more users. The locational data may be used to determine how many of the one or more users likely visited the given geographic location after receiving the suggestion. In some implementations the ranking system 140 may adjust the ranking of the suggestion for the given geographic location based on the determination of how many of the users likely visited the given geographic location after receiving the suggestion. The suggestion system 130 may make subsequent suggestions for the given location based on the adjusted ranking. In some implementations determining how many of the one or more users visited the given geographic location after receiving a suggestion for the given geographic location may include identifying locational queries and/or check-ins to the given geographic location by the one or more users. The term "check-in", as used herein, includes a user-approved and/or user-initiated indication of a visit to a location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, locational data may indicate that the user is at Location A, and the user, via a mobile computing device, may automatically check-in to Location A. Additional and/or alternative techniques to check-in to a geographical location may be utilized.

In some implementations if it is determined that at least a threshold number of the one or more users visited the given geographic location after receiving the suggestion, a ranking of the suggestion may be promoted for future suggestions. In some implementations if it is determined that at least a threshold number of the one or more users failed to visit the given geographic location after receiving the suggestion, a ranking of the suggestion may be demoted for future suggestions.

In some implementations the users for whom it is determined that a threshold number visited and/or failed to visit the given geographic location after receiving the suggestion may be a first grouping of users. In some implementations the suggestion may also be provided to a second grouping of users. Locational data may be identified for the second grouping of users and it may be determined how many of the second grouping of users visited the given geographic location after receiving the suggestion. A property of the given geographic location may be determined based on a comparison of how many of the first grouping of users visited the given geographic location after receiving the suggestion and how many of the second grouping of users visited the given geographic location after receiving the suggestion.

In some implementations suggestions may be provided based on user approval to receive suggestions on one or more client devices 110. For example, a user may choose to be informed of locations in which the user may be interested; promotions at local stores; discounted ticket sales to sporting events; happy hour specials at a local pub; membership rebates at a gym; weekend activities for kids; and so forth.

In some implementations one or more of the suggestions provided may be suggestions that are tailored to the users' interests. For example, one or more users may have indicated an interest in sports-related activities, and the suggestions to the one or more users may include suggestions to purchase tickets to upcoming sporting events, suggestions to visit a sporting goods store, suggestions to join a sporting league, and so forth. As another example, one or more users may have purchased tickets to a particular theater in the past, and the suggestions to the one or more users may include suggestions to see the upcoming productions at that theater. As another example, one or more users may have indicated interest in a particular musical group, and suggestions may be provided to the one or more users for venues where the group may be performing in the future. As another example, one or more users may have responded positively to a particular type of suggestion in the past, and suggestions may be provided to the one or more users that are of the same and/or similar suggestion type.

As discussed herein, in some implementations one or more suggestions may be selected for a user based on an adjusted ranking determined based on how other users responded to the suggestions. Additional factors may be taken into account in determining a ranking for a suggestion and/or determining when a suggestion is provided to a user. For example, in some implementations suggestions may be provided in response to a search query submitted by the user at a client device 110. For example, in some implementations a search system 120 may receive a submitted query from the client device 110, and may execute the query against a database (e.g., content database 150) of available documents such as web pages, images, text documents, and multimedia content. The search system 120 may identify documents in the content database 150 which are responsive to the query, and may respond by generating search results which may be transmitted to the client device 110. In some implementations the suggestion system 130 may identify suggestions to include with the search results and/or to provide separately from the search results (e.g., in the future in response to further user activity that indicates particular interest in one or more of the search results). The ranking system 140 may rank the suggestions before they are transmitted to the client device 110. The ranking of the suggestions may be utilized to select one or more suggestions to provide and/or to determine a display order of provided suggestions. For example, in response to a query from the client device 110, the suggestion system 130 may provide the search system 120 with a ranked list of suggestions to be displayed in combination with search results on the web browser 115 executing on the client computing device 110. In some implementations the ranking of suggestions and/or determination of whether a given suggestion is provided may be based on the submitted query and/or the search results responsive to the submitted query.

In some implementations the suggestions may be provided in response to a locational query issued by a user. A locational query may include a query issued via a mapping application and/or other application that seeks location information related to an entity. For example, the user may issue a locational query of "Restaurant A" via a mapping application, such as a web-based mapping application. The mapping application may identify one or more search results for Restaurant A and provide a map to the user that displays the geographic location of one or more of the search results on the map. In response to such a search, one or more suggestions (e.g., visiting an art exhibition before dinner, visiting a pub after dinner, going to the theater, etc.) may be provided to the user based on the geographic location of Restaurant A and/or other factors. In some implementations the suggestion system 130 may identify suggestions to include with the search results the search results (e.g., in the future in response to further user activity that indicates particular interest in one or more of the search results). As another example, the user may issue a locational query of "Restaurant A" and suggestions may be provided for similar restaurants near the geographic location of Restaurant A.

Locational queries may additionally and/or alternatively include directional locational queries that seek active and/or static directions to a geographic location via a mapping service. Directional locational queries may be issued by the user to one or more mapping services. For example, the user may submit a directional locational query via client device 110 that seeks directions to a geographic location. One or more mapping services may be utilized to return directions to the geographic location. Active directional locational queries seek active directions to a location, such as via a device equipped with GPS. For example, a user may submit an active directional locational query by providing the address of a geographic location to a navigation device equipped with a GPS and may receive active turn-by-turn directions to the geographic location. Static directional locational queries seek non-active directions to a location, such as via a map-based service. For example, upon searching for Restaurant A, the user may be provided with a suggested static directional locational query, such as a selectable option to "get directions" to Restaurant A. Upon selecting the option to receive directions to Restaurant A, the user may be provided with a map showing one or more directional paths from the user's location of choice to Location A.

In some implementations determining a ranking for a suggestion and/or determining when to provide a suggestion to a user may be based on the physical location of the user. In some implementations the physical location of the user may be based on locational data described herein. For example, a user's physical location may be identified as being in the downtown area and suggestion system 130 may provide suggestions for downtown restaurants to the user. Likewise, suggestions for local suburban restaurants may be provided to users that are identified as being in a particular suburban area. As another example, a user in the vicinity of a mall may be provided suggestions to visit one or more stores in the mall. As another example, the user in the vicinity of a mall may be provided with suggestions to participate in one or more ongoing promotional events at the mall. In some implementations the physical location of the user may be based on identified locational data as described herein.

In some implementations locational data may be identified via the content database 150. For example, in some implementations the content database 150 may include locational data for each of one or more users and/or groupings of users. Locational data associated with a visit to a given geographic location for a given user and/or grouping of users may include, for example, data indicative of: a date, day of the week, time, and/or time duration of actual and/or indicated visits of one or more users to the given geographic location, an origination geographic location for the visit, data related to the given geographic location and/or an origination geographic location, visit duration time of the visit at the given geographic location, data associated with one or more groupings of users and/or a grouping to which the given user may belong, and/or data related to a passage of time between receiving a suggestion for the given geographic location and visiting the given geographic location. In some implementations utilized locational data may be restricted based on one or more aspects of the locational data. For example, locational data may be restricted based on the range of dates of the visits, days of the week of the visits, and/or time of the days of the visits.

In some implementations any locational data may not be tethered to the identity of individual users and may not be traceable to a specific user. For example, in some implementations locational data associated with a given suggestion and/or geographic location may only be accessible when at least a threshold number of users have navigated to the given geographic location after receiving the given suggestion. Also, for example, in some implementations a list of visit duration times of visits at a given geographic location by one or more users may be provided without identifying any particular user. In some implementations locational data associated with the visit duration time at a given geographic location may be accessible only when at least a threshold number of users have visited the given geographic location. Also, for example, in some implementations locational data may include data that represents a summary of actual and/or indicated visits from a plurality of users. For example, an origination geographic location may be a neighborhood and other data associated with the origination geographic location that may represent a summary of data from a grouping of users from that neighborhood. Additional and/or alternative forms of locational data may be utilized such as those additional and/or alternative forms discussed herein. Locational data may be based on one or more actual and/or indicated visits from users such as those discussed herein. For example, locational data may be based on one or more of locational queries, geolocational data from mobile devices and/or other client devices 110, financial transactions at a given geographic location, user indications of visits to a given geographic location (e.g. check-ins), and so forth. In some implementations utilized locational data may optionally be restricted based on one or more aspects of the locational data. For example, locational data may be restricted based on the geographic location, based on one or more suggestions associated with the locational data, and/or one or more groupings of users.

Locational data may be used to determine how many of one or more users associated with the locational data visited a given geographic location after receiving a suggestion for the given geographic location. For example, a user may receive a suggestion on a mobile device and/or other client device 110 for weekend discounts at a local furniture store. Locational data may be used to determine if the user actually visited the store. As another example, a user may receive a suggestion to visit a family friendly restaurant, and locational data may be used to determine if the user actually visited the restaurant. For example, if the user searches for and/or views a menu of the restaurant after receiving a suggestion for the restaurant, it may indicate that the user will actually travel to the restaurant.

In some implementations the determination of how many of the one or more users visited the given geographic location after receiving the suggestion may include identifying a locational query of a user to the given geographic location. For example, in some implementations the locational data may include data based on a navigation system providing active locational directions to the given geographic location. For example, a record of active directional locational queries may be stored in a database such as the content database 150 that includes the destination geographic locations of the locational queries and optionally the origination geographic locations of the locational queries.

In some implementations the determination of how many of the one or more users visited the given geographic location after receiving the suggestion may be identified based on one or more searches related to the given geographic location. In some implementations the search system 120 may provide such data in response to a user submitting a query. For example, in some implementations the data provided by the search system 120 may be identified in response to locational queries. In some implementations locational queries may provide a signal of the user's intent to visit a given geographic location. For example, for a given geographic location, locational data based on locational queries may be provided by the search system 120 for storage in a database such as content database 150. For example, a record of directional locational queries may be stored that includes the destination location of the directional locational query and optionally the source location of the directional locational query.

In some implementations any utilized directional locational queries may optionally be verified based on additional data to increase a confidence level that the user will actually travel to the destination geographic location. For example, geolocational data from a mobile device and/or other client device 110 of a user associated with the direction query may be utilized to verify that the user actually visited the destination geographic location. Also, for example, data from a user's social network may be utilized to increase confidence that the user actually visited the destination geographic location. For example, the user may check-in to the destination geographic location via the social network, and/or may post a comment related to the destination geographic location via the social network. Also, for example, data from a user's search history and/or browsing history may be utilized to increase confidence that the user will actually travel to the destination geographic location. For example, the user may issue a search related to the restaurant, read reviews for the restaurant, and/or view an online menu for the restaurant after receiving a suggestion to visit the restaurant.

In some implementations any origination and/or destination locational data may specify a geographic location in the form of a latitude, longitude pair. In some implementations any origination and/or destination locational data may specify a geographic location in the form a textual address, for example, "1234 Example Road, City, Calif. 12345" or "Example Restaurant 12345".

In some implementations determining of how many of the one or more users visited the given geographic location after receiving the suggestion may be identified based on at least one of cellular tower signals and Wi-Fi signals. For example, locational data associated with a visit to a given geographic location may be additionally and/or alternatively identified from cellular tower signals providing network connectivity to a mobile phone or other client device 110 as a user visits a geographic location with the mobile phone. As another example, the user may access a Wi-Fi network at a geographic location, and this may indicate presence at the geographic location. In some implementations locational data may be provided by the mobile phone or other client device 110 and/or locational data may be based on signals provided by the mobile phone and/or other client device 110 at certain time intervals as a user moves with the mobile phone and/or other client device 110. In some implementations any locational data identified from a mobile phone and/or other client devices 110 may not be identifiable to a specific user. In some implementations, the users may be provided with an opportunity to control whether programs or features collect user information such as locational data.

In some implementations determining how many of the one or more users visited the given geographic location after receiving a suggestion may include determining that at least a threshold number of the users visited the given geographic location. For example, determining how many of the one or more users visited the given geographic location after receiving the suggestion may include determining that locational data of at least a threshold percentage of users indicates the users visited the geographic location after receiving the suggestion. For example, a threshold percentage may be 5% for a geographic location and it may be determined that 12% of the users who received a suggestion visited the geographic location after receiving the suggestion. Accordingly, having satisfied the threshold percentage of 5%, the one or more users may be determined as having visited the given geographic location after receiving the suggestion. On the other hand, it may be determined that only 3% of the users who received the suggestion visited the geographic location after receiving the suggestion. Accordingly, having failed to satisfy the threshold percentage of 5%, the one or more users may be determined as not having visited the given geographic location after receiving the suggestion.

Also, for example, determining how many of the one or more users visited the given geographic location after receiving a suggestion may include determining that at least a threshold number of users determined to have visited the geographic location had received the suggestion to visit the geographic location. For example, a threshold percentage may be 15% for a geographic location and it may be determined that locational data indicates that 25% of the visits to the geographic location were by users determined to have received a suggestion to visit the geographic location. In this instance, having satisfied the threshold percentage of 15%, such users may be identified as having visited the geographic location after receiving the suggestion to visit the geographic location. On the other hand, it may be determined that only 8% of the visits to the geographic location were by users determined to have received the suggestion to visit the geographic location. Accordingly, having failed to satisfy the threshold percentage of 15%, the one or more users may be determined as not having visited the given geographic location after receiving the suggestion.

In some implementations any utilized threshold may be a fixed threshold. In some implementations the threshold may be based on the type of geographic location (e.g., venue, restaurant, retail store). For example, a threshold may be determined for a particular type of restaurant (e.g., fine dining, casual, fast food) based on a distribution of numbers of users in visits to such restaurants. In some implementations the threshold may be based on the locational data itself. For example, statistical analysis may be performed on the locational data for one or more users visiting a geographic location after receiving a suggestion to visit the geographic location to determine a statistically significant threshold. In some implementations the one or more users may belong to a grouping of users and the threshold may be determined for users in the grouping of users. In some implementations the threshold may be based on a determination of an average and/or median acceptance rate for all suggestions, all suggestions to a grouping of one or more locations, and/or all suggestions in a grouping of suggestions. In some implementations the averages and/or medians may be weighted, where the weights may be determined based on at least one of the location, the grouping of suggestions, and/or the grouping of users. A determined threshold for a suggestion for a geographic location may be generally indicative of a number of users that should travel to the geographic location after receiving the suggestion to indicate the suggestions is a useful suggestion for the geographic location.

In some implementations the ranking of a suggestion for a geographic location may be adjusted based on the determination of how many of one or more users visited the geographic location after receiving the suggestion. For example, a user may be provided with a suggestion for a geographic location and locational data may be utilized to determine that the user visited the geographic location after receiving the suggestion. The ranking of the suggestion may be adjusted to be more indicative of usefulness of the suggestion in response to the determination that the user visited the geographic location after receiving the suggestion. Likewise, if it is determined that the user did not visit the geographic location after receiving the suggestion, the ranking of the suggestion may be adjusted to be less indicative of usefulness. Also, for example, the ranking of a suggestion associated with a given geographic location may be promoted if it is determined that at least a threshold number of users who received the suggestion visited the given geographic location. Also, for example, the ranking of a suggestion associated with a given geographic location may be demoted if it is determined that at least a threshold number of users who received the suggestion failed to visit the given geographic location.

In some implementations the degree of promotion and/or demotion of a ranking of a suggestion may be based on the number of users who received the suggestion and visited the given geographic location. For example, in some implementations: if the number of users who received the suggestion and visited the geographic location is within 5% of a threshold generally indicative of an expected number of users, then the ranking may not be adjusted; if the number of users who received the suggestion and visited the geographic location is between 5% and 20% more than the threshold, then the ranking may be promoted a first degree; if the number of users who received the suggestion and visited the geographic location is greater than 20% more than the threshold, then the ranking be promoted a second degree that is greater than the first degree of promotion; if the number of users who received the suggestion and visited the geographic location is between 5% and 15% less than the threshold, then the ranking be demoted a first degree; and if the number of users who received the suggestion and visited the geographic location is less than 15% less than the threshold, then the ranking be demoted a second degree that is greater than the first degree of demotion. Additional and/or alternative scaled promotions and/or demotions of rankings may be utilized. In some implementations the ranking system 140 may adjust the ranking of suggestions.

In some implementations the ranking system 140 may access a list of suggestions from the content database 150 and rank the list based on one or more criteria. In some implementations the ranking system 140 may determine a first set of suggestions and a second set of suggestions. The first and second set of suggestions may be determined for an individual user, a grouping of users, and/or a group of suggestions. In some implementations the first and second set of suggestions may be determined based on a determination of a threshold number of users visiting and/or not visiting geographic locations associated with the suggestions after receiving the suggestions. For example, a suggestion for a geographic location may be placed in the first set of suggestions if locational data indicates that a threshold number of users visited the geographic location after receiving the suggestion. The determination of how many users visited the geographic location after receiving the suggestion may be based on, for example, a number of locational queries for the geographic location from the users after receiving the suggestion for the geographic location or other locational data indicating a visit to the geographic location after receiving the suggestion for the geographic location. A suggestion may be placed in the second set of suggestions if locational data indicates that less than a threshold number of users visited the geographic location after receiving the suggestion. In some implementations a ranking associated with one or more suggestions from the second set of suggestions may be downgraded. In some versions of those implementations one or more suggestions from the second set of suggestions may not be provided to one or more users as future suggestions.

In some implementations the ranking system 140 may access a list of suggestions from the suggestion system 130 and rank the suggestions. For example, the ranking system 140 may sort the list using one or more sorting techniques. In some implementations the ranking system 140 may compare two or more suggestions at a time and order them relative to each other based on one or more criteria. For example, suggestion A may be associated with a higher ranking than suggestion B based on the number of users determined to have visited a geographic location after receiving each suggestion. For example, it may be determined that 25% of the users determined to have received suggestion A for a first geographic location visited the first geographic location, whereas 5% of the users determined to have received suggestion B for a second geographic location visited the second geographic location. Accordingly, suggestion A may be ranked higher than suggestion B. In some implementations, suggestion B may not be provided as a future suggestion to users.

In some implementations the ranking may be based on the threshold associated with a given geographic location. For example, the threshold percentage may be 15% for the given geographic location and suggestions A, B, and C, may be provided for the given geographic location. In some implementations locational data may be identified and utilized to determine the number of users determined to have visited the given geographic location after receiving each of suggestions A, B, and C. For example, locational data may indicate that 25% of the users that visited the given geographic location were users that received suggestion A; 47% of the users that visited the given geographic location were users that received suggestion B, and 12% of the users determined that visited the given geographic location were users that received suggestion C. In some implementations the ranking system 140 may rank the suggestions A, B, and C with suggestion B ranked the highest, suggestion A ranked next, and suggestion C ranked the lowest. In some implementations, the ranking system 140 may rank suggestions A and B, and omit suggestion C from future suggestion since the percentage of users associated with suggestion C (12%) is below the threshold percentage of 15%.

In some implementations an existing ranking of one or more geographic locations and/or suggestions may be utilized in ranking of one or more suggestions. In some implementations the ranking may additionally and/or alternatively be based on one or more groupings of users. For example, rankings for geographic locations may be provided and based on scores between 0 and 1, with a higher ranking being more indicative of a higher ranking. Geographic location 1 may be associated with a score of 0.2, geographic location 2 may be associated with a score of 0.7, and geographic location 3 may be associated with a score of 0.1. Locational data may indicate that 50% of the users from a first grouping of users that received suggestion A for a geographic location 1 visited geographic location 1 as compared to 20% of the users from the second grouping of users. Similarly, it may be determined that 20% of the users from the first grouping of users that received suggestion B for a geographic location 2 visited geographic location 2 as compared to 25% of the users from the second grouping of users; and 30% of the users from the first grouping of users that received suggestion C for a geographic location 3 visited geographic location 3 as compared to 55% of the users from the second grouping of users. Rankings may be determined for each suggestion based on the existing scores of the geographic locations and the determination of how many users visited the geographic locations after receiving the suggestions.

In some implementations the rankings may be suggestion relevance scores that are determined for the suggestions. For example, suggestion relevance scores may be determined by multiplying the respective percentages with the respective existing scores. For example, for the first grouping of users, suggestion A may be determined to have a suggestion relevance score of $0.5 \times 0.2 = 0.1$, suggestion B may be determined to have a suggestion relevance score of $0.2 \times 0.7 = 0.14$, and suggestion C may be determined to have a suggestion relevance score of $0.3 \times 0.1 = 0.03$. Likewise, for the second grouping of users, suggestion A may be determined to have a suggestion relevance score of $0.2 \times 0.2 = 0.04$, suggestion B may be determined to have a suggestion relevance score of $0.25 \times 0.7 = 0.175$, and suggestion C may be determined to have a suggestion relevance score of $0.55 \times 0.1 = 0.055$.

Additional and/or alternative rankings determinations for a suggestion relevance score may be utilized. The suggestion relevance score may be based on one or more factors including the number of users determined to have visited a geographic location after receiving the suggestion, the passage of time between receiving the suggestion and visiting the geographic location, and/or the number of recurring visits to the geographic location. In some implementations one or more of these factors may be weighted. Additional and/or alternative methods of ranking may be utilized.

As another example, the ranking system 140 may access a list of five suggestions A, B, C, D, and E from the content database 150. In some implementations the suggestions may be associated with an existing ranking based on one or more criteria such as ratings of the geographic locations with which they may be associated. For example, the suggestions may be ranked in order as A through E, with suggestion A corresponding to the highest ranking and suggestion E corresponding to the lowest ranking. In some implementations it may be determined that 20% of a grouping of users that received suggestion A for a geographic location visited the geographic location after receiving suggestion A. Likewise, it may be determined that the percentages associated with the other suggestions are 50% for suggestion B, 80% for suggestion C, 15% for suggestion D, and 5% for suggestion E. In some implementations the ranking system 140 may rank the suggestions in order as suggestion C, suggestion B, suggestion A, suggestion D, and suggestion E based on the percentages of users determined to have visited the respective geographic locations after receiving the respective suggestions. In some implementations, the suggestion system 130 may not provide one or more of suggestions to one or more users as a potential future suggestion. For example, suggestions D and/or E may not be provided as future suggestions due to the relatively low number of users determined to have visited the respective geographic locations after receiving the suggestions. In some implementations the ranking system 140 may adjust an existing ranking of the suggestions A-E based on the suggestion relevance scores.

In some implementations a determined ranking may be based on the average number of recurring visits to the geographic location. For example, suggestion A and suggestion B may be suggestions for the same geographic location. It may be determined that 25% of the users determined to have received suggestion A visited the geographic location compared to 50% of the users determined to have received suggestion B. On comparing the percentages, suggestion B may be determined to be more useful than suggestion A and may accordingly be ranked higher. However, it may be determined that users determined to have received suggestion A visited the geographic location an average of three times after receiving the suggestion. On the other hand, it may be determined that users determined to have received suggestion B visited the geographic location an average of one time after receiving the suggestion. The ranking system 140 may determine a ranking based on the number of repeat visits. For example, suggestion relevance scores may be determined based on the number of repeat visits. In some implementations the suggestion relevance scores may be determined based on multiplying the percentage of users visiting a geographic location after receiving a suggestion for the geographic location with the average number of visits to the geographic location after receiving the suggestion. For example, the suggestion relevance score for suggestion A may be determined as $0.25 \times 3 = 0.75$ and for suggestion B as $0.5 \times 1 = 0.5$. In this instance, suggestion A may be determined to be more useful than suggestion B and ranking system 140 may rank suggestion A higher than suggestion B.

In some implementations the ranking of the suggestions may include adjusting the display order of suggestions provided to a user in addition to or as an alternative to assigning a suggestion relevance score to the suggestions. In some implementations a suggestion may be displayed in a position that is based on its suggestion relevance score. For example, in some implementations a suggestion associated with a suggestion relevance score more indicative of usefulness may be promoted as a suggestion. For example, the suggestion may be displayed as the only suggestion, as one of the first of a number of suggestions, and/or as part of a separate set of suggestions. Also, for example, the order of the suggestion in a listing may be improved based on its suggestion relevance score. For example, the order of the suggestion may be improved a number of positions, where the number of positions is based on its suggestion relevance score. Additional and/or alternative adjusted rankings based on the suggestion relevance score for the suggestion may be utilized.

In some implementations a suggestion may be associated with a ranking less indicative of usefulness based on a determination that a threshold number of one or more users failed to visit the given geographic location after receiving the suggestion. For example, a suggestion may be provided to one or more users to visit the local theater to preview the upcoming production. Locational data may indicate that a threshold percentage of users receiving the suggestion failed to preview the upcoming production at that theater. For example, it may be determined that 70% of the users determined to have received the suggestion failed to preview the upcoming production at that theater. Accordingly, the ranking of the suggestion may be adjusted so that it may be less indicative of usefulness.

As another example, a suggestion relevance score associated with suggestion A may be more indicative of usefulness than a suggestion relevance score associated with suggestion B based on a comparison of their respective percentages of users determined to have visited the geographic location after receiving the respective suggestions.

For example, it may be determined that 70% of the users determined to have received suggestion A failed to preview the upcoming production at the theater whereas 30% of the users determined to have received suggestion B failed to preview the upcoming production at the theater. Accordingly, the suggestion relevance score associated with suggestion B may be more indicative of usefulness than the suggestion relevance score associated with suggestion A. In some implementations suggestion A and suggestion B may be suggestions for two distinct geographic locations. For example, suggestion A may be a suggestion to visit the theater and suggestion B may be a suggestion to visit a family friendly restaurant.

In some implementations a visit duration time of one or more users at the given geographic location may be determined and the ranking of the suggestion may be adjusted based on the visit duration time. For example, in some implementations the ranking associated with a suggestion for a geographic location may be based on whether one or more visit duration times associated with locational data indicating visits to the geographic location satisfy a time threshold. For example, in some implementations short visit duration times at a given geographic location may be less indicative of a visit to engage in a suggested activity at the given geographic location after receiving the provided suggestion than would lengthy visit duration times at the given geographic location. For example, locational data associated with a short visit duration time at a suggested geographic location may not be considered an actual visit and/or may be weighted less heavily (or not at all) in determining a ranking than locational data associated with a long visit duration time at the suggested geographic location. In some implementations actual visit duration times associated with locational data may be compared to anticipated visit duration times to determine a weighting of the locational data in determining the ranking. Anticipated visit duration times may be based on the geographic location and/or type of activity. For example an anticipated visit duration time of two minutes may be the appropriate amount of time indicative of a visit to a coffee shop, whereas an anticipated visit duration time indicative of a visit to a dining establishment may be twenty minutes or more.

As another example, locational data associated with a suggestion for a geographic location that indicates a relatively short average visit duration time may be associated with a ranking less indicative of usefulness. On the other hand if the locational data were to indicate a relatively long average visit duration time it may be associated with a ranking more indicative of usefulness. In some implementations visit duration time may not be provided with some or all of the locational data. In some implementations visit duration time may not be utilized in determining an adjusted ranking.

In some implementations the ranking system 140 may provide the determined ranking for storage in a database such as content database 150. In some implementations stored data may optionally be associated with a suggestion in the database for future access. In some implementations the future access may be, for example, by the suggestion system 130. In some implementations the suggestion system 130 may access the ranked suggestions provided by the ranking system 140. The suggestion system 130 may then provide one or more suggestions from the ranked list of suggestions to the client device 110.

In some implementations the users for which locational data is identified may be a grouping of users and the ranking of the suggestion may be determined only for the grouping of users. For example, the ranking system 140 may utilize locational data associated with one or more groupings of users in determining a ranking. These groupings of users may include one or more latent types that have no natural interpretation, or may be semantically meaningful types. For example, the grouping of users may include users that share a similar age range, such as teenagers, college undergraduates, retirees, and people over forty, couples in their thirties, and singles over fifties. As another example, the grouping of users may include users that are grouped as a certain user type based on one or more shared attributes. As another example, the grouping of users may include one or more users from a common region, such as a zip code, a county, a business district, a city, a township, a municipal area, a state, and/or a country. For example, in some implementations, the common region may include one or more of the eastern, southern, midwestern, southwestern, central, and/or pacific regions of the United States. Also, for example, other designations such as "small town", "medium-sized town", "small city", and "large city" may be used to identify a common region. In some implementations, one or more databases such as content database 150 may store information related to regions from one or more sources such as mapping services, online web pages, tourist guides, government publications, census data, published brochures, weather data services, and/or news agencies.

Accordingly, any ranking of a suggestion may be specific to the grouping of users. For example, first and second groupings of users may be identified and a suggestion may be promoted for users in the first grouping of users, whereas the same suggestion may be demoted for users in the second grouping of users. For example, a suggestion to visit the theater may be promoted for a first grouping of users having first characteristics whereas the suggestion to visit the theater may be demoted for a second grouping of users having second characteristics.

As another example, it may be determined that 50% of the users from the first grouping of users who received suggestion A for a geographic location 1 visited geographic location 1 as compared to 20% of the users from the second grouping of users. Similarly, it may be determined that 20% of the users from the first grouping of users who received suggestion B for a geographic location 2 visited geographic location 2 as compared to 25% of the users from the second grouping of users; and 30% of the users from the first grouping of users who received suggestion C for a geographic location 3 visited geographic location 3 as compared to 55% of the users from the second grouping of users. Accordingly, in some implementations the ranking system 140 may determine a ranking of the suggestions for the first grouping of users that ranks the suggestions in order as suggestion A, suggestion C, then suggestion B. Additionally and/or alternatively the ranking system 140 may determine a ranking of the suggestions for the second grouping of users that ranks the suggestions in order as suggestion C, suggestion B, then suggestion A.

In some implementations a property of the given geographic location may be determined based on a comparison of how many of a first grouping of users visited the given geographic location after receiving the suggestion and how many of a second grouping of users visited the given geographic location after receiving the suggestion. For example, a suggestion for a restaurant may be provided to one or more users in a first grouping of users that includes all users. Users with children may be identified as the second grouping of users. It may be determined that a predominantly high percentage of those users determined to have visited the restaurant after receiving the suggestion were from the second grouping of users. In such an instance the restaurant property may be determined to be "a family friendly restaurant", "popular among users with children" and/or "popular among users in the second grouping of users" due to the predominantly high percentage of users with children determined to have visited the restaurant after receiving the suggestion. On the other hand, it may be determined that a predominantly low percentage of those users determined to have visited the restaurant after receiving the suggestion were from the second grouping of users. In such an instance the restaurant property may be determined to be "not a family friendly restaurant", "not popular among users with children" and/or "not popular among users in the second grouping of users" due to the predominantly low percentage of users with children determined to have visited the restaurant after receiving the suggestion.

As another example, a suggestion for a restaurant may be provided to one or more users in a first grouping of users that includes users with children. Users who enjoy spicy food may be identified as the second grouping of users. It may be determined that a predominantly high percentage of those users determined to have visited the restaurant after receiving the suggestion were from the second grouping of users. In such an instance the restaurant property may be determined to be "popular among users who enjoy spicy food" due to the predominantly high percentage of users who enjoy spicy food determined to have visited the restaurant after receiving the suggestion. Additionally and/or alternatively, the restaurant property may be determined to be "not popular among users with children" due to the predominantly low percentage of users with children determined to have visited the restaurant after receiving the suggestion.

In some implementations the users may be a grouping of users and the ranking of the suggestion may be adjusted only for the grouping of users. For example, in the example above, the suggestion for the family friendly restaurant may be ranked higher for users with children. In some implementations users with children may be provided a suggestion for the restaurant, and optionally, an accompanying remark stating that the restaurant is "a family friendly restaurant". Likewise, if the restaurant property is determined to be "not a family friendly restaurant" then the suggestion for this restaurant may be ranked lower for users with children. Users in this grouping of users may be provided a suggestion for the restaurant, and optionally, an accompanying remark stating that the restaurant is "not a family friendly restaurant".

As another example, if the restaurant property is determined to be "popular among users who enjoy spicy food", then the suggestion for this restaurant may be ranked higher for users who enjoy spicy food. In some implementations users who enjoy spicy food may be provided a suggestion for the restaurant, and optionally, an accompanying remark stating that the restaurant is "popular among users who enjoy spicy food". In some implementations the suggestion for this restaurant may be ranked lower for users with children. In some implementations users in with children may be provided a suggestion for the restaurant, and optionally, an accompanying remark stating that the restaurant is "popular among users who enjoy spicy food" and/or that the restaurant is "not a family friendly restaurant".

In some implementations the first grouping of users and the second grouping of users may include one or more overlapping users. For example, the first grouping of users and the second grouping of users may include the same users. Also, for example, the first grouping of users and the second grouping of users may each share a common subset of users. In some implementations the first and second groupings of users may not include any overlapping users.

Figure 2:
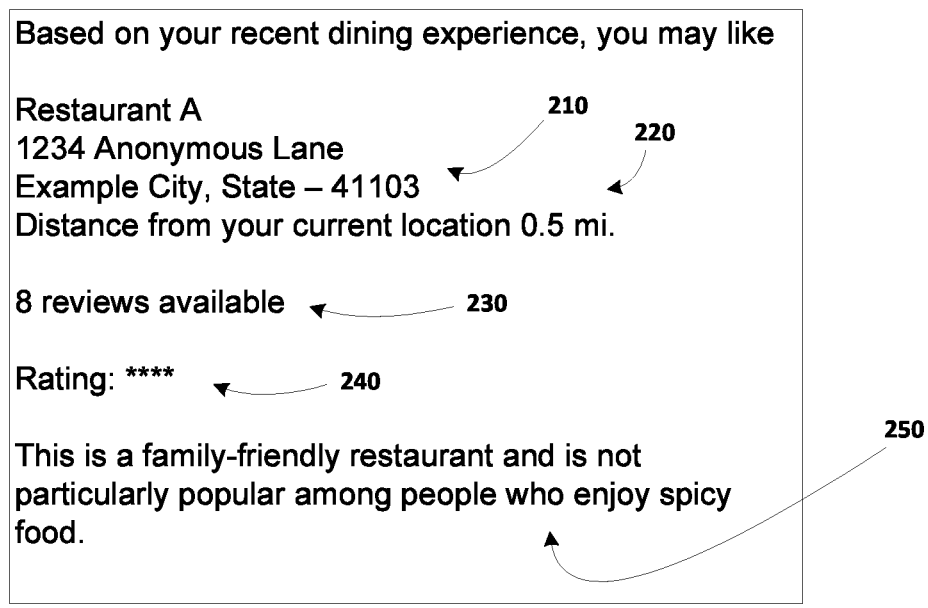
FIG. 2 illustrates an example suggestion provided to a user.

Referring to FIG. 2, an example suggestion provided to a user is illustrated. The suggestion may include the name and location of a suggested restaurant 210. In this example, for illustrative purposes, the name is shown as "Restaurant A" and the address is shown as "1234 Anonymous Lane, Example City, State—41103." The distance 220 of the restaurant from the user's current location may be provided, for example, as being 0.5 miles. In some implementations review information 230 may be provided, such as, for example, "8 reviews available." Ranking information 240 for the restaurant 210 may also be provided, such as, for example, a star rating "****." In some implementations the suggestion may be annotated with a remark 250. For example, the suggestion may be annotated with the remark "This is a family-friendly restaurant and is not particularly popular among people who enjoy spicy food." The suggestion of FIG. 2 is provided as one example. Alternative suggestions may be provided including those with additional and/or alternative information than that illustrated in FIG. 2 and/or additional and/or alternative graphical representations.

In some implementations it may be determined that a threshold number of the one or more users failed to visit the given geographic location within a time period after receiving the suggestion. In some implementations the locational data indicative of one or more users physically visiting the given geographic location after receiving a suggestion for the given geographic location may additionally and/or alternatively include locational data indicative of passage of time between receiving the suggestion and arriving at the given geographic location. Such a passage of time may be utilized to rank the suggestion. For example, in some implementations only locational data that is indicative of presence at the given geographic location within a threshold of time (e.g., within 1 hour of receiving the suggestion) may be utilized. Also, for example, in some implementations locational data that is indicative of presence at the given geographic location outside a threshold of time may optionally be weighted less significantly (e.g., in determining a ranking). In some implementations locational data that is indicative of travel to a geographic location may be utilized regardless of the passage of time.

In some implementations the ranking of a suggestion may be based on the passage of time between receiving the suggestion and visiting the geographic location. For example, it may be determined that locational data indicates that 15% of the users that received suggestion A for a geographic location issued locational queries for the geographic location within one day after receiving the suggestion; 10% of the users issued locational queries between two to three days after receiving the suggestion; and 5% of the users issued locational queries more than three days after receiving the suggestion. In some implementations, the ranking of the suggestion may be determined by weighting the indicated visits based on the passage of time. For example a weight of 0.6 may be associated with indicated visits associated with a passage of time that is within one day after receiving the suggestion; a weight of 0.4 may be associated with indicated visits associated with a passage of time that is between two to three days after receiving the suggestion; and a weight of 0.0 may be associated with indicated visits associated with a passage of time that is more than three days after receiving the suggestion. In some implementations, a suggestion relevance score for a suggestion may be determined by multiplying, for each passage of time, the percentage of users indicating a visit in the corresponding passage of time by the weight associated with the corresponding passage of time, and summing those values. For example, for suggestion A, the suggestion relevance score may be determined as $(0.6\times0.15)+(0.4\times0.10)+(0.0\times0.05)=0.13$.

As another example, it may be determined that 25% of users that received a suggestion for a geographic location visited the geographic location after receiving the suggestion and of those users determined to have visited the geographic location after receiving the suggestion for the geographic location: 20% of the users visited the geographic location within one day after receiving the suggestion; 40% of the users visited between two to three days after receiving the suggestion; 2% of the users visited more than three days after receiving the suggestion; and there is no passage of time data associated with 38% of the users. For example a weight of 1.2 may be associated with indicated visits associated with a passage of time that is within one day after receiving the suggestion; a weight of 0.8 may be associated with indicated visits associated with a passage of time that is between two to three days after receiving the suggestion; a weight of 0.6 may be associated with indicated visits associated with a passage of time that is more than three days after receiving the suggestion; and a weight of 1.0 may be associated with indicated visits that aren't associated with a passage of time. In some implementations, a suggestion relevance score for a suggestion may be determined by multiplying, for each passage of time, the overall percentage of users indicating a visit by the number of users indicating a visit in the corresponding passage of time by the weight associated with the corresponding passage of time, and summing those values. For example, the suggestion relevance score for the suggestion may be determined as $1.2(0.25\times0.20)+0.8(0.25\times0.4)+0.6(0.25\times0.02)+1(0.25\times0.38)=0.238$.

In some implementations the locational data indicative of one or more users physically visiting the geographic location after receiving a suggestion may include locational data indicative of travel to the geographic location directly after receiving the suggestion without any intervening stops. In some implementations the locational data indicative of one or more users physically visiting the geographic location after receiving a suggestion may additionally and/or alternatively include locational data indicative of travel to the geographic location after receiving the suggestion with one or more intervening stops. In some implementations locational data indicative of travel to the geographic location after receiving the suggestion with one or more intervening stops may optionally be weighted less significantly in ranking the suggestion. For example, locational data indicative of travel to the geographic location after receiving the suggestion with one or more intervening stops may optionally be provided a decreasing weight as the number intervening stops increases. In some implementations thresholding of certain locational data based on the number of intervening stops may be utilized. For example, locational data indicative of travel to the geographic location after receiving the suggestion may only be utilized if less than a threshold of intervening stops is present.

For example, it may be determined that 25% of the users determined to have received a suggestion and indicated travel to the geographical location physically visited the geographic location directly after receiving the suggestion without any intervening stops; 20% physically visited the geographic location after receiving the suggestion with one intervening stop; 35% physically visited the geographic location after receiving the suggestion with two intervening stops; 10% physically visited the geographic location after receiving the suggestion with three intervening stops; and 10% physically visited the geographic location after receiving the suggestion with four or more intervening stops. In some implementations the number of intervening stops may be used to determine a suggestion relevance score and/or other ranking.

In some implementations the weights may be of decreasing value as the number intervening stops increases. For example, a weight of 1 may be associated with no intervening stops; a weight of 0.8 may be associated with one intervening stop; a weight of 0.6 may be associated with two intervening stops; a weight of 0.4 may be associated with three intervening stops; and a weight of 0.2 may be associated with four or more intervening stops. For example, the respective percentages and weights may be multiplied together and then added to determine a suggestion relevance score as: $(0.25\times1)+(0.8\times0.2)+(0.6\times0.35)+(0.4\times0.1)+(0.2\times0.1)=0.68$. In some implementations the weights may be normalized to sum to one and weighted averages of the percentages may be utilized to determine a suggestion relevance score and/or other ranking. In some implementations, locational data indicative of travel to the geographic location after receiving the suggestion may not be utilized if more than a threshold number of intervening stops is present. For example, in the preceding example, locational data may not be utilized if four or more intervening stops are present. Accordingly, the suggestion relevance score may be determined as $(0.25\times1)+(0.8\times0.2)+(0.6\times0.35)+(0.4\times0.1)=0.66$.

As discussed herein, in some implementations a suggestion may be prevented from being provided as a future suggestion based on a determination that a threshold number of users failed to visit a geographic location associated with the suggestion after receiving the suggestion. In some implementations the ranking system 140 may associate a lower ranking with the suggestion based on the determination that a threshold number of users failed to visit a geographic location associated with the suggestion after receiving the suggestion. For example, a threshold percentage of users may be 15% and it may be determined that only 10% of users visited the geographic location after receiving the suggestion. Accordingly, the suggestion may be removed as a suggestion or the ranking of the suggestion may be demoted based on such a determination.

Also, as discussed herein, in some implementations locational data may be identified for a grouping of users and the ranking of the suggestion may be adjusted only for the grouping of users. For example, suggestions for a lunch hour furniture sale at a local home furnishings store may be provided to a grouping of users that includes working professionals. A threshold percentage of users may be 15%. Locational data for users in the grouping of users may indicate that 12% of working professionals visited the store after receiving the suggestion. Accordingly, the suggestion may be removed as a suggestion for the grouping of users based on the determination that the threshold number of the one or more users failed to visit the geographic location after receiving the suggestion.

In some implementations the suggestion for which a ranking is adjusted may be a group of suggestions. For example, one or more suggestions may be grouped based on one or more factors such as the geographic location the suggestions may relate to, the property of the geographic location the suggestions may relate to, how far users were from the geographic location when the suggestion was provided, the time of day when the suggestion may be provided, the day of the week when the suggestions may be provided, one or more groupings of users that the suggestion may be provided to, and so forth.

For example, suggestions for restaurants in downtown may form a first group of suggestions whereas suggestions for sports bars may form a second group of suggestions. As another example, suggestions for Italian restaurants may form a first group of suggestions whereas suggestions for Irish restaurants may form a second group of suggestions. Also, for example, suggestions for coffee shops in downtown may form a first group of suggestions; suggestions for day time parking locations in downtown may form a second group of suggestions; and suggestions for evening parking locations in downtown may form a third group of suggestions. As another example, suggestions for family friendly restaurants offering pizza may form a first group of suggestions; suggestions for family friendly restaurants offering game arcades may form a second group of suggestions; suggestions for family friendly restaurants offering weekend discounts may form a third group of suggestions; and suggestions for family friendly restaurants near a movie theater may form a fourth group of suggestions.

As another example, suggestions for a geographic location may be grouped based on how far a user is from the geographic location when the suggestion is provided to the user. For example, suggestions provided to users that are within a mile of the geographic location may form a first group of suggestions and suggestions provided to users that are more than a mile from the geographic location may form a second group of suggestions. Locational data may indicate that a relatively large number of users receiving the first group of suggestions visited the geographic location whereas a relatively small number of users receiving the second group of suggestions visited the geographic location. In such a situation the ranking of the first group of suggestions may be promoted and/or the ranking of the second group of suggestions may be demoted. This will increase the likelihood that the first group of suggestions (those provided when users are within a mile of the associated geographic location) will be provided to users as future suggestions.

In some implementations the group of suggestions may be provided to one or more users in a grouping of users. For example, users with children may be provided groups of suggestions such as suggestions for family friendly restaurants offering pizza; suggestions for family friendly restaurants offering game arcades; suggestions for family friendly restaurants offering weekend discounts; and suggestions for family friendly restaurants near a movie theater. In some implementations, the same users may be provided different suggestions for the same geographic location, based on, for example, the time of day and/or the day of the week. For example, a grouping of professionals working downtown may be provided with groups of suggestions such as suggestions for coffee shops in downtown during the day; suggestions for parking locations in downtown during the day; and suggestions for parking locations in downtown on Friday evenings.

In some implementations a determined ranking based on locational data may be stored in a database, such as content database 150. Any stored data about a given geographic location, a given user, and/or a grouping of users may be accessed by one or more components. For example, in some implementations identified rankings of one or more suggestions for a given geographic location may be utilized to recommend the given geographic location to a user and/or grouping of users. For example, in some implementations the given geographic location may be recommended to a user based on identification of presence of the user near the given geographic location. Also, for example, a mobile phone or other client device 110 of a user may provide an indication of the user's intent to visit a location near the geographic location (e.g., typing the name and/or address of a nearby restaurant) and a recommendation for the given geographic location may be provided to the user via the mobile phone and/or other client device 110. Also, for example, a user may issue a search for a location near the geographic location via the search system 120 and/or may issue a search that returns search results similar to the given geographic location. The search system 120 may identify the given geographic location and provide one or more search results based on the given geographic location. Also, for example, the search system 120 may enable a map-based search and, in response to a search query that returns results near the given geographic location, may additionally recommend the given geographic location to the user.

As discussed herein, locational data from one or more databases such as content database 150 may be utilized in refining a suggestion for a geographic location. For example, content database 150 may include locational data for each of one or more geographic locations. For example, content database 150 may include locational data for a geographic location that is associated with a group of suggestions and/or a grouping of users. The information about the geographic location may include an identifier of the geographic location such as an address, a latitude and longitude, a zip code, a neighborhood, and/or other identifier. In this specification, the term "database" will be used broadly to refer to any collection of data. The data of the database does not need to be structured in any particular way, or structured at all, and it can be stored on storage devices in one or more geographic locations. Thus, for example, the content database 150 may include multiple collections of data, each of which may be organized and accessed differently.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personally identifiable information is removed. For example, a user's identity may be treated so that no personally identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The search system 120, the suggestion system 130, and/or the ranking system 140 may be implemented in hardware, firmware, and/or software running on hardware. For example, one or more of the systems may be implemented in one or more computer servers.

The search system 120 may receive a user's query related to a geographic location from a computing device 110, and execute the search query against a database of collection of documents such as web pages, images, text documents, and multimedia content to produce search results. The collection of documents may be stored in the content database 150, and/or other storage devices. In some implementations the search system 120 may use properties of one or more geographic locations, rankings of one or more suggestions, and/or associations between suggestions for one or more geographic locations and users to identify and/or rank search results. Any identified search results may be displayed in the web browser 115 or other application executing on the client computing device 110.

Many other configurations are possible having more or fewer components than the environment shown in FIG. 1. For example, in some environments the search system 120 and/or the content database 150 may be omitted. Also, for example, in some environments one or more of the suggestion system 130 and the ranking system 140 may be combined.

Figure 3:
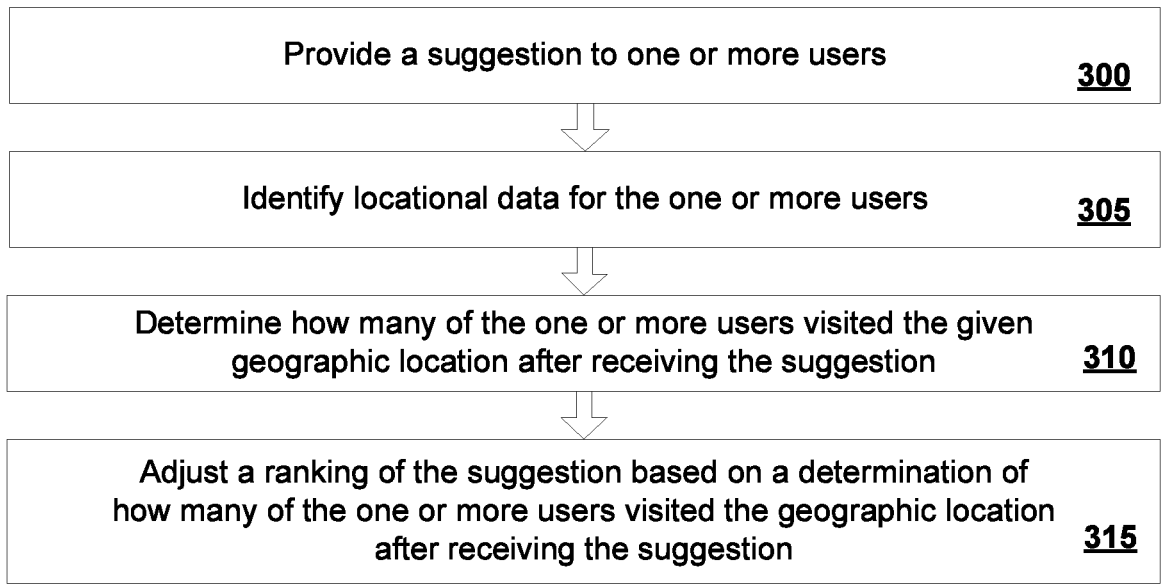
FIG. 3 is a flow chart illustrating an example method of adjusting the ranking of a suggestion for a geographic location based on determining how many of one or more users visited the geographic location after receiving the suggestion.

Referring to FIG. 3, a flow chart illustrates an example method of adjusting the ranking of a suggestion for a geographic location based on determining how many of one or more users visited the geographic location after receiving the suggestion. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the suggestion system 130 and/or the ranking system 140 of FIG. 1.

At step 300, a suggestion is provided to one or more users. The suggestion may be indicative of potential user activity at a given geographic location. The potential user activity may be, for example, an activity the user may enjoy and/or potentially engage in at the given geographic location. In some implementations the suggestion may be provided via the suggestion system 130. In some implementations suggestions may be provided based on user approval to receive suggestions on one or more client devices 110. In some implementations suggestions may be provided based on the physical location of the user. For example, suggestion system 130 may identify a user's physical location as being in the downtown area and may provide suggestions for downtown restaurants to the user.

At step 305, locational data for the one or more users may be identified. The locational data is associated with the given geographic location with which the suggestion of step 300 is associated. In some implementations locational data may be identified via the content database 150. For example, in some implementations the content database 150 may include locational data for each of one or more users that is associated with an indicated and/or actual visit to a given geographic location. In some implementations locational data identified at step 305 may be restricted based on one or more aspects of the locational data. For example, locational data may be restricted based on the range of dates of the visits, days of the week of the visits, and/or time of the days of the visits. Also, for example, locational data may be restricted based on one or more characteristics of users with which it is associated.

At step 310 it is determined how many of the one or more users visited the given geographic location after receiving the suggestion. For example, the locational data identified at step 305 may be used to determine how many of the one or more users visited the given geographic location after receiving the suggestion. In some implementations the determination of how many of the one or more users visited the given geographic location after receiving the suggestion may include identifying a directional locational query of a user to the given geographic location. For example, in some implementations the locational data may include data based on a navigation system providing active locational directions to the given geographic location. For example, a record of active navigations may be stored in a database such as the content database 150 that includes the destination geographic locations of the navigations and optionally the source geographic locations of the navigations.

At step 315 a ranking of the suggestion is adjusted based on a determination of how many of the one or more users visited the geographic location after receiving the suggestion. For example, if a user is provided with a suggestion for a geographic location, and locational data indicates that the user visited the geographic location after receiving the suggestion, the ranking of the suggestion may be adjusted to be more indicative of usefulness of the suggestion. Likewise, if the user does not indicate a visit to the geographic location after receiving the suggestion, the ranking of the suggestion may be adjusted to be less indicative of usefulness of the suggestion. In some implementations the ranking system 140 may adjust the ranking of the suggestion.

Figure 4:
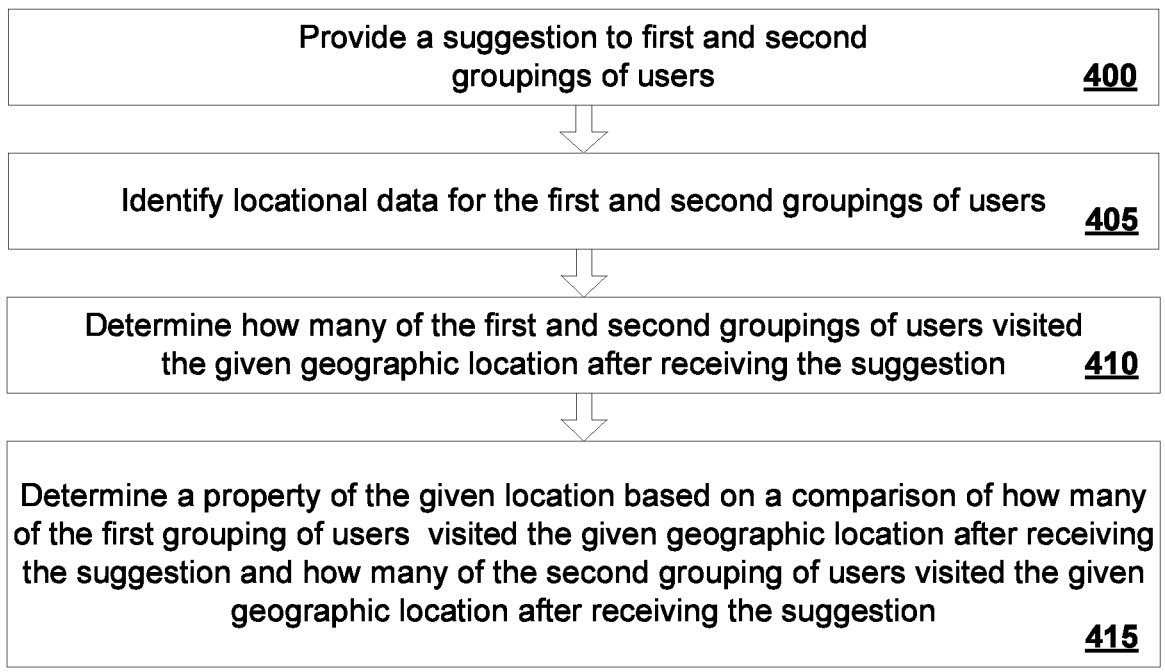
FIG. 4 is a flow chart illustrating an example method of determining a property of a geographic location based on a comparison of how many of a first grouping of users visited the geographic location after receiving the suggestion and how many of a second grouping of users visited the geographic location after receiving the suggestion.

Referring to FIG. 4, a flow chart illustrates an example method of determining a property of a geographic location based on a comparison of how many of a first grouping of users visited the geographic location after receiving the suggestion and how many of a second grouping of users visited the geographic location after receiving the suggestion. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example the suggestion system 130 and/or the ranking system 140 of FIG. 1.

At step 400, a suggestion is provided to first and second groupings of users. For example, the first and second groupings of users may include users that share a similar age range, such as teenagers, college undergraduates, retirees, and people over forty, couples in their thirties, and singles over fifties. As another example, the first and second groupings of users may include users that are grouped as a certain user type based on one or more shared attributes. As another example, the first and second groupings of users may each include one or more users from a common region, such as a zip code, a county, a business district, a city, a township, a municipal area, a state, and/or a country. For example, in some implementations, the common region may include one or more of the eastern, southern, midwestern, southwestern, central, and/or pacific regions of the United States. Also, for example, other designations such as "small town", "medium-sized town", "small city", and "large city" may be used to identify a common region. In some implementations step 400 may share one or more aspects in common with step 300 of FIG. 3.

At step 405, locational data for the first and second groupings of users is identified. In some implementations the locational data may be identified via the content database 150. For example, in some implementations locational data may be identified that includes locational data based on locational queries stored in content database 150. In some implementations step 405 may share one or more aspects in common with step 305 of FIG. 3.

At step 410 it is determined how many of the first and second groupings of users visited the given geographic location after receiving the suggestion. For example, the locational data for the first grouping of users identified at step 405 may be used to determine how many of the first groupings of users visited the given geographic location after receiving the suggestion and the locational data for the second grouping of users identified at step 405 may be used to determine how many of the second groupings of users visited the given geographic location after receiving the suggestion. In some implementations step 410 may share one or more aspects in common with step 310 of FIG. 3.

At step 415 a property of the given geographic location is determined based on a comparison of how many of the first grouping of users visited the given geographic location after receiving the suggestion and how many of the second grouping of users visited the geographic location after receiving the suggestion.

For example, a suggestion for a restaurant may be provided to one or more users in a first grouping of users that includes all users. Users with children may be identified as the second grouping of users. It may be determined that a predominantly high percentage of those users determined to have visited the restaurant after receiving the suggestion were from the second grouping of users. In such an instance the restaurant property may be determined to be "a family friendly restaurant", "popular among users with children" and/or "popular among users in the second grouping of users" due to the predominantly high percentage of users with children determined to have visited the restaurant after receiving the suggestion. On the other hand, it may be determined that a predominantly low percentage of those users determined to have visited the restaurant after receiving the suggestion were from the second grouping of users. In such an instance the restaurant property may be determined to be "not a family friendly restaurant", "not popular among users with children" and/or "not popular among users in the second grouping of users" due to the predominantly low percentage of users with children determined to have visited the restaurant after receiving the suggestion.

Figure 5:
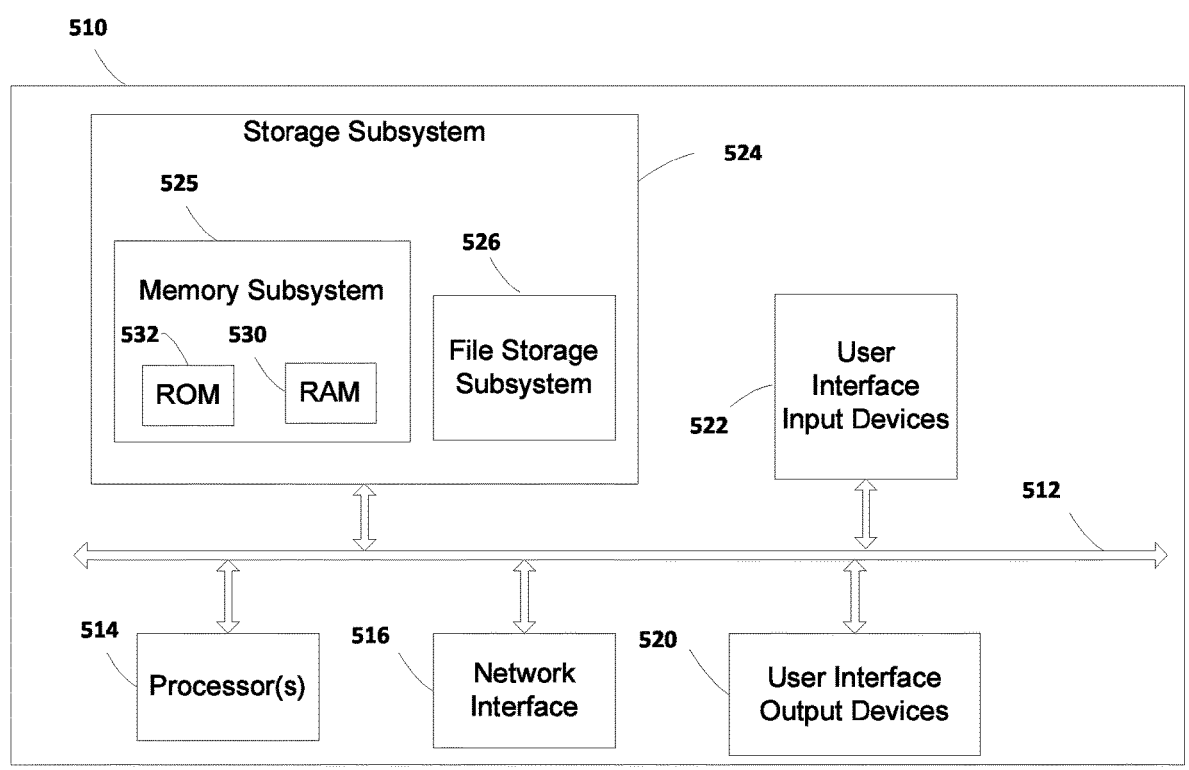
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to adjust a ranking of a suggestion for a geographic location based on determining how many of one or more users visited the geographic location after receiving the suggestion. The storage subsystem 524 may additionally, and/or alternatively include the logic to determine a property of the given geographic location based on a comparison of how many of a first grouping of users visited the given geographic location after receiving the suggestion and how many of a second grouping of users visited the given geographic location after receiving the suggestion.

These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more geographic locations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    providing, using one or more processors, a suggestion to a first user, the suggestion being associated with a geographic location;
    determining, using the one or more processors, locational data associated with the first user;
    determining, after providing the suggestion and based on the locational data, using the one or more processors, whether the first user visited the geographic location after receiving the suggestion;
    receiving a search query from a second user;
    determining, using the one or more processors, whether the first and second user belong to a grouping of users;
    in response to the search query and using the one or more processors, determining a score based on whether the first user visited the geographic location after receiving the suggestion, and whether the first and second user belong to the grouping;
    ranking, based on the score and using the one or processors, a first search result associated with the geographic location relative to a second search result; and
    providing for display, using the one or more processors, the first search result and the second search result in a ranked order.

2. The method of claim 1 wherein determining the score further comprises determining the score based on whether the second user visited the geographic location before said receiving a search query.

3. The method of claim 2 wherein determining the score further comprises determining the score based on a number of recurring visits to the geographic location.

4. The method of claim 1 wherein the grouping comprises users sharing an attribute.

5. The method of claim 1 wherein the grouping is based on user age range.

6. The method of claim 1 wherein the suggestion is associated with a potential user activity at the geographic location.

7. The method of claim 1 wherein the search query seeks directions to a geographic location via mapping service.

8. A system comprising:
one or more processors, and
memory storing instructions and data, the instructions being executable by the one or more processors,
wherein the data comprises data indicative of whether a first user visited a geographic location after receiving a suggestion to visit the geographic location, and
wherein the instructions comprise:
receiving a search query from a second user;
determining whether the first and second user belong to the same grouping of users;
in response to the search query, determining a score based on whether the first user visited the geographic location after receiving the suggestion, and whether the first and second user belong to the same grouping;
ranking, based on the score, a first search result associated with the geographic location relative to a second search result; and
providing for display the first search result and the second search result in a ranked order.

9. The system of claim 8 wherein determining the score further comprises determining the score based on whether the second user visited the geographic location before said receiving a search query.

10. The system of claim 9 wherein determining the score further comprises determining the score based on a number of recurring visits to the geographic location.

11. The system of claim 8 wherein the grouping comprises users sharing an attribute.

12. The system of claim 8 wherein the suggestion is associated with a potential user activity at the geographic location.

13. A system comprising:
one or more processors, and
memory storing instructions and data, the instructions being executable by the one or more processors,
wherein the data comprises a first grouping of users, a first value indicative of a number of users in the first grouping that visited a geographic location after receiving a suggestion associated with the geographic location, a second grouping of users, and a second value indicative of a number of users in the second grouping that visited the geographic location after receiving the suggestion, the second value indicating that more users of the second grouping visited the geographic location than the first location;
wherein the instructions comprise:
receiving a search query from a user;
determining, using the one or more processors, whether the user belongs to the first grouping of users or the second grouping of users;
in response to the search query and using the one or more processors, determining a score for a search result related to the geographic location based on the first value when the user belongs to the first grouping and based on the second value when the user belongs to the second grouping;
ranking the search result based on the score, wherein the search result is ranked higher relative to other search results when the user belongs to the second grouping than when the user belongs to the first grouping; and
providing for display, using the one or more processors, the search result and the other search results in a ranked order.

14. The system of claim 13 wherein the second grouping is a subset of the first grouping.

15. The system claim 13 wherein the first value is indicative of a percentage of users in the first grouping that visited the geographic location after receiving the suggestion.

16. The system of claim 13 wherein determining the score further comprises determining the score based on whether the user visited the geographic location before said receiving a search query.

17. The system of claim 16 wherein determining the score further comprises determining the score based on a number of recurring visits to the geographic location.

18. The system of claim 13 wherein the users of the first grouping share an attribute and the users of the second grouping share a different attribute.

19. The system of claim 13 wherein the suggestion is associated with a potential user activity at the geographic location.

20. The system of claim 19 wherein the search result is associated with a potential user activity at the geographic location.

* * * * *